(12) United States Patent  (10) Patent No.: US 8,451,378 B2
Cheng  (45) Date of Patent: May 28, 2013

(54) VIDEO DEVICE CAPABLE OF DETECTING CONNECTION TO DISPLAY DEVICES

(75) Inventor: Ming-Chieh Cheng, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 781 days.

(21) Appl. No.: 12/639,140

(22) Filed: Dec. 16, 2009

(65) Prior Publication Data

US 2011/0043703 A1 Feb. 24, 2011

(30) Foreign Application Priority Data

Aug. 21, 2009 (CN) .............................. 200920308488

(51) Int. Cl.
*H04N 5/46* (2006.01)
*H04N 5/268* (2006.01)

(52) U.S. Cl.
USPC ........... 348/571; 348/558; 348/553; 348/739; 348/540; 348/706

(58) Field of Classification Search
USPC ................. 348/705, 706, 553, 558, 571, 572, 348/573, 739, 540
See application file for complete search history.

(56) References Cited

U.S. PATENT DOCUMENTS

2009/0174816 A1* 7/2009 Hellman et al. .............. 348/553

* cited by examiner

*Primary Examiner* — Jefferey Harold
*Assistant Examiner* — Jean W Desir
(74) *Attorney, Agent, or Firm* — Altis Law Group, Inc.

(57) ABSTRACT

A video device to generate analog video signals to a plurality of display devices comprises a video processing chip, a plurality of video output interface circuits and a plurality of detection circuits. The video processing chip converts input video data into the analog video signals and comprises at least one video decoder and a plurality of analog to digital convertors. The video output interface circuit transmits the analog video signals to the plurality of display devices. The detection circuit detects voltage of horizontal sync signals of the analog video signals to determine connection of the video output interface circuit to the display device, and generates a feedback signal to the video processing chip to control the video decoder and the analog to digital convertor accordingly.

13 Claims, 2 Drawing Sheets

VIDEO DEVICE CAPABLE OF DETECTING CONNECTION TO DISPLAY DEVICES

BACKGROUND

1. Technical Field

Embodiments of the present disclosure relate to video devices, and particularly to a video device operable to detect connection thereof to display devices.

2. Description of Related Art

A commonly used video device, such as a set-top-box or DVD player, often comprises more than one video output interface for connection to multiple display devices. Generally, the video device outputs video signals to all the video output interfaces irrespective of connection thereto. In practice, output from the video device is only viewed on one of the display devices, whereby video signals transmitted to the other output interfaces are unused, wasting power.

BRIEF DESCRIPTION OF THE DRAWINGS

Many aspects of the embodiments can be better understood with references to the following drawings, wherein like numerals depict like parts, and wherein.

DETAILED DESCRIPTION

Figure 1:
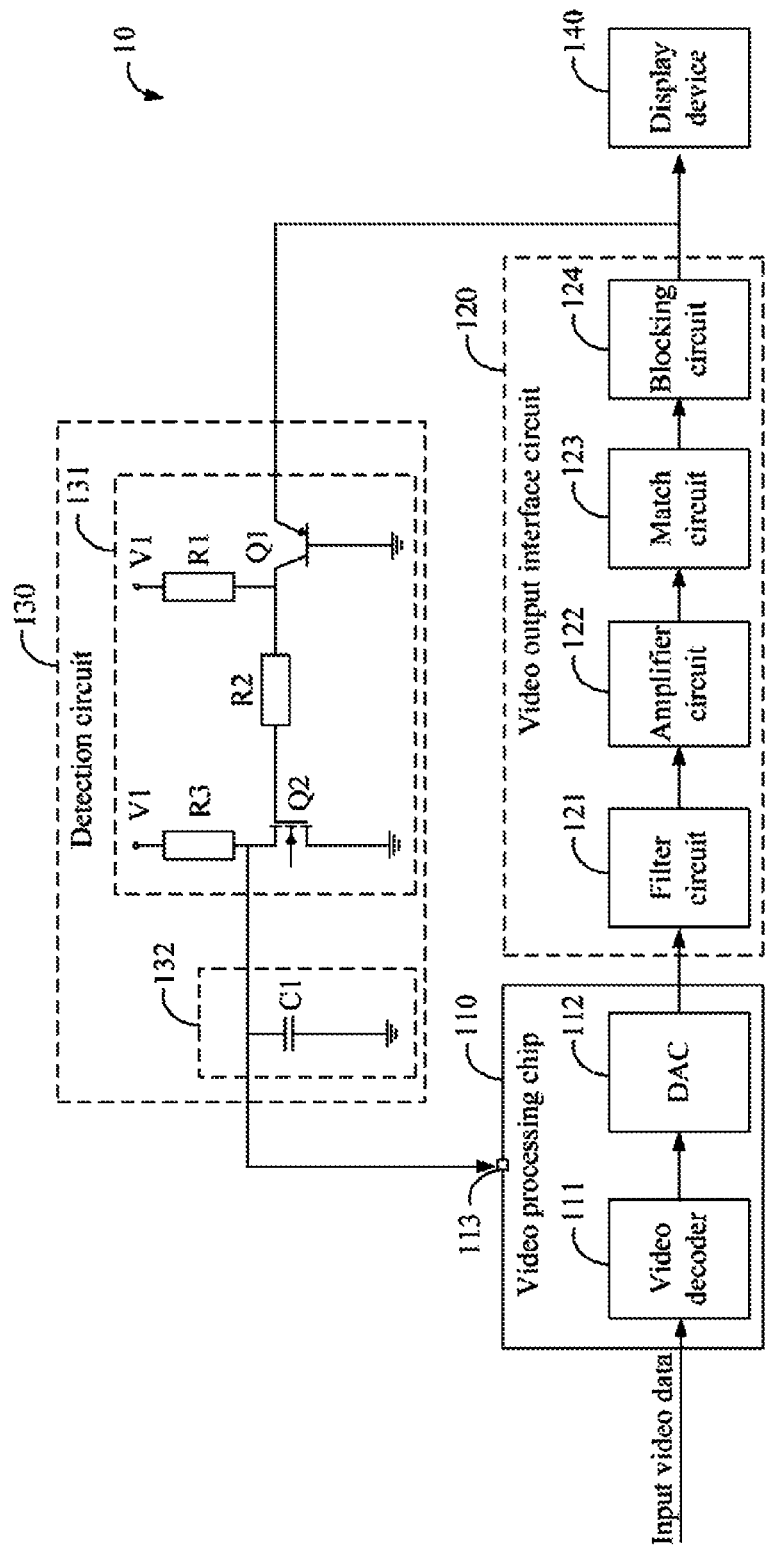
FIG. 1 is a schematic diagram of a video device of one embodiment of the present disclosure.

Referring to FIG. 1, a schematic diagram of a video device 10 of one embodiment of the present disclosure is shown. In the embodiment, the video device 10 processes input video data and outputs video signals to a display device 140 for viewing. The video device 10 comprises a video processing chip 110, at least one video output interface circuit 120 and a detection circuit 130. For simplicity of description, only one video output interface circuit 120 is illustrated in FIG. 1. The video processing chip 110 converts the input video data into analog video signals. The video output interface circuit 120 transmits the analog video signals to the display device 140, such as a television, or a projector. The detection circuit 130 detects connection of the video output interface circuit 120 to the display device 140, and generates a feedback signal to the video processing chip 110 accordingly. Correspondingly, the video processing chip 110 stops outputting the analog video signals to the video output interface circuit 120 when the display device 140 is not connected to the video output interface circuit 120. In this embodiment, the feedback signal can be at high logic level (e.g. logical 1) or low logic level (e.g. logical 0).

The video processing chip 110 comprises a video decoder 111 and a digital to analog convertor (DAC) 112. The video decoder 111 receives and processes the input video data to generate digital video signals. The DAC 112 converts the digital video signals into the analog video signals, and outputs the analog video signals to the video output interface circuit 120. In the embodiment, the analog video signals output by the video processing chip 110 comprise, for example, horizontal sync signals, vertical sync signals and color sync signals, and others. The horizontal sync signals are negative pulse signals with a predetermined frequency, for example, of 25 MHz. Voltage of the horizontal sync signals of the analog video signals output by the video processing chip 110 is about, for example, −0.3V.

In addition, the video processing chip 110 further comprises a feedback pin 113 to receive the feedback signal output by the detection circuit 130. The video decoder 111 and the DAC 112 are under control of the feedback signal. For example, when the feedback signal is at high logic level, the video decoder 111 and the DAC 112 stop converting the input video signals into the analog video signals, whereby the video processing chip 110 stops outputting the analog video signals to the video output interface circuit 120. Conversely, when the feedback signal is at low logic level, the video decoder 111 and the DAC 112 receive and convert the input video data into the analog video signals, whereby the video processing chip 110 outputs the analog video signals to the video output interface circuit 120. In the embodiment, the feedback pin 113 may be an interrupt pin or general purpose input/output (GPIO) pin configured in the video processing chip 110.

The video output interface circuit 120 comprises a filter circuit 121, an amplifier circuit 122, a match circuit 123 and a blocking circuit 124.

The filter circuit 121 is connected to the DAC 112, to receive the analog video signals, and filters noise in the analog video signals.

The amplifier circuit 122 is connected to the filter circuit 121, and amplifies the filtered analog video signals. In the embodiment, the amplifier circuit 122 is configured with an amplification coefficient of about two, which means the analog video signals are amplified by about two. Therefore, the voltage of the horizontal sync signals of the amplified analog video signals is amplified to about −0.6V.

The match circuit 123 connected to the amplifier circuit 122 is configured for impedance matching between the video output interface circuit 120 and the display device 140. In general, the display device 140 has a load impedance of about 75Ω. Correspondingly, the match circuit 123 is configured to the same impedance. In the embodiment, the match circuit 123 is a resistor with resistance of about 75Ω.

In the embodiment, the blocking circuit 124 is a DC blocking capacitor with one end connected to the match circuit 123, and the other end acting as an output of the video output interface circuit 120. The blocking circuit 124 transmits the amplified analog signals to the display device 140 after blocking direct current (DC) interference therein.

The detection circuit 130 is connected between the output of the video output interface circuit 120 and the feedback pin 113 of the video processing chip 110. The detection circuit 130 detects the voltage of the horizontal sync signals of the analog video signals output by the video output interface circuit 120 to determine whether the display device 140 is connected to the video output interface circuit 120. In the embodiment, both the load impedance of the display device 140 and the impedance of the match circuit 123 are about 75Ω. Therefore, when the display device 140 is connected to the video output interface circuit 120, the voltage of the horizontal sync signals of the analog video signals is −0.3V. When the display device 140 is not connected to the video output interface circuit 120, the voltage of the horizontal sync signals of the analog video signals is −0.6V.

In the embodiment, the detection circuit 130 is configured to generate the feedback signal and transmit the feedback signal to the feedback pin 113 of the video processing chip 110 to indicate the connection of the video output interface circuit 120 to the display device 140. In the embodiment, when the display device 140 is connected to the video output interface circuit 120, the detection circuit 130 generates the feedback signal at high logic level. Conversely, when the display device 140 is not connected to the video output interface circuit 120, the detection circuit 130 generates the feedback signal at low logic level.

In the embodiment, the detection circuit 130 comprises a switch circuit 131 and a charger circuit 132. The switch circuit 131 comprises an input connected to the output of the video output interface circuit 120 to detect the voltage of the horizontal signals of the analog video signals, and an output connected to the feedback pin 113 of the video processing chip 110 to output the feedback signals. In the embodiment, the switch circuit 131 comprises a transistor Q1 and a metal-oxide semiconductor (MOS) transistor Q2. The transistor Q1 comprises a base grounded, a collector connected to a reference voltage V1 via a first resistor R1, and an emitter acting as the input of the switch circuit 131. The MOS transistor Q2 comprises a source grounded, a gate connected to the collector of the transistor Q1 via a second resistor R2, and a drain connected to the reference voltage V1 via a third resistor R3. In the embodiment, the drain of the MOS transistor Q2 acts as the output of the switch circuit 131. In the embodiment, the reference voltage V1 is about 3.3V.

The charge circuit 132 is connected between the output of the switch circuit 131 and the ground. The charge circuit 132 is charged when the switch circuit 131 outputs the feedback signal of high logic level to the feedback pin 113 of the video processing 110. Conversely, the charge circuit 132 discharges to maintain the feedback signal as high logic level for a time period after the switch circuit 131 stops outputting the feedback signal of high logic level. In the embodiment, the charge circuit 132 is a capacitor C1 connected between the output of the switch circuit 131 and the ground.

When the display device 140 is not connected to the video output interface circuit 120, the voltage of the horizontal sync signals of the analog video signals output by the video output interface circuit 120 is −0.6V, and the voltage carried on the emitter of the transistor Q1 is −0.6V. Accordingly, the transistor Q1 turns on, and the MOS transistor Q2 turns off. Therefore, the voltage carried on the drain of the MOS transistor Q2 is about 3.3V, which means the detection circuit 130 outputs the feedback signal at high logic level to the feedback pin 113 of the video processing chip 110.

In addition, the charger circuit 132 is charged by the feedback signal at high logic level. Consequently, the video decoder 111 and the DAC 112 stop converting the input video data into the analog video signals, and the video output interface circuit 120 stops outputting the analog video signals. Therefore, the voltage carried on the emitter of the transistor Q1 is about 0V. Accordingly, the transistor Q1 turns off, and the MOS transistor Q2 turns on. As the drain of the MOS transistor Q2 is grounded, the charger circuit 132 discharges to maintain the feedback signal at high logic level for the time period.

When the charger circuit 132 discharges over, the detection circuit 130 stops outputting the feedback signal at high logic level to the feedback pin 113 of the video processing chip 110, and the video decoder 111 and the DAC 112 convert the input video signals into the analog video signals, and the video output interface circuit 120 outputs the analog video signals. Repeatedly, the detection circuit 130 detects the voltage of the horizontal sync signals of the analog video signals output by the video output interface circuit 120 as set forth above.

When the display device 140 is connected to the video output interface circuit 120, the voltage of the horizontal sync signals of the analog video signals output by the video output interface circuit 120 is about −0.3V, and the voltage carried on the emitter of the transistor Q1 is about −0.3V. Accordingly, the transistor Q1 turns off, the MOS transistor Q2 turns on. Therefore, the drain of the MOS transistor Q2 is grounded, and the detection circuit 130 outputs the feedback signal at low logic level to the feedback pin 113 of the video processing chip 110.

Figure 2:
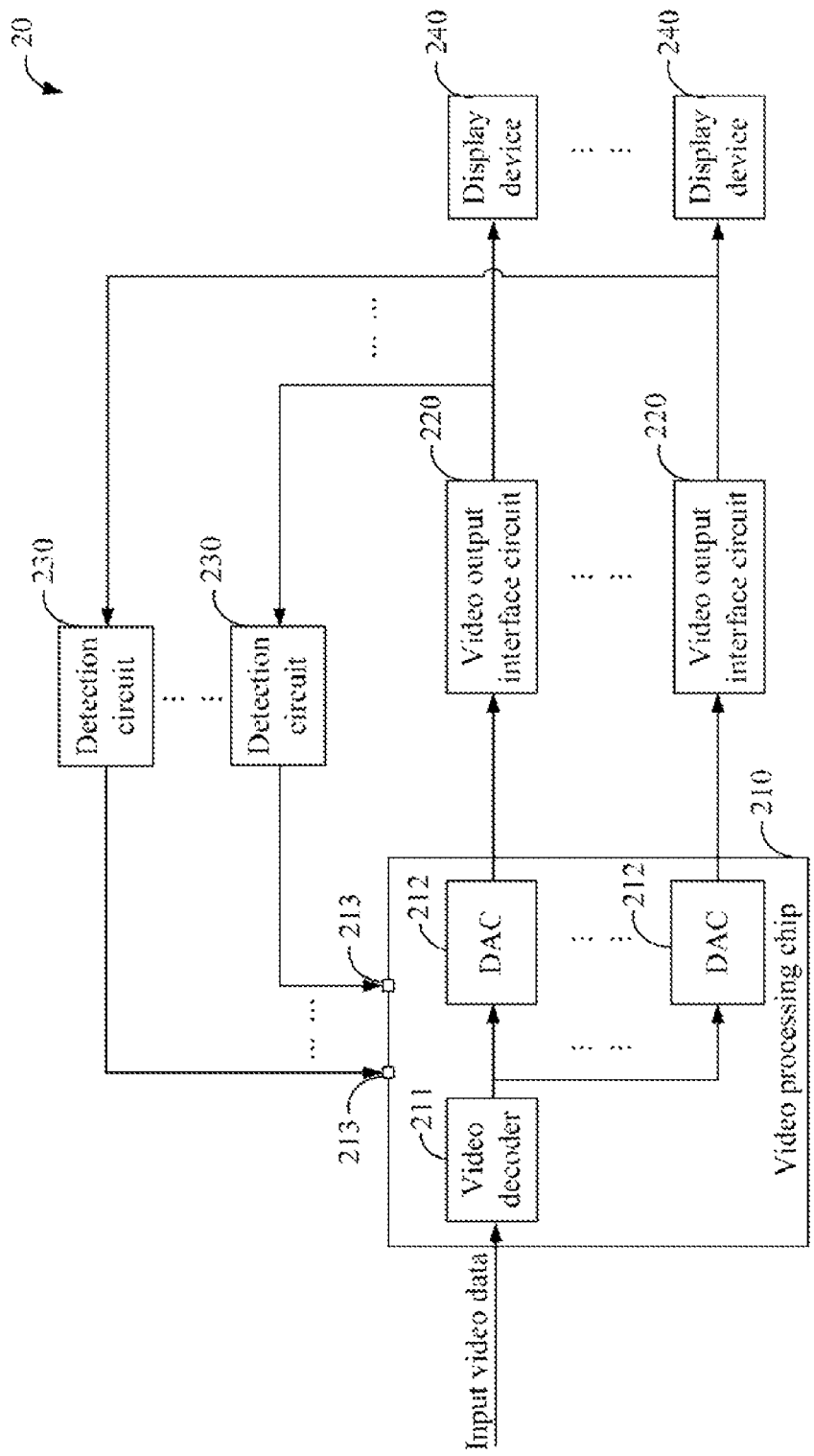
FIG. 2 is a schematic diagram of a video device of another embodiment of the present disclosure.

Referring to FIG. 2, a schematic diagram of a video device 20 of another embodiment of the present disclosure is shown. In the embodiment, the video device 20 comprises a plurality of video output interface circuits 220 adapted to output the amplified analog signals to corresponding plurality of display device 240. Accordingly, the video device 20 comprises a plurality of detection circuits 230 corresponding to the plurality of video output interface circuits 220, and a video processing chip 210 configured with a video decoder 211 and a plurality of DACs 212. The video decoder 211 receives and processes the input video data so as to generate the digital video signals to transmit to the plurality of DACs 212. In alternative embodiments, the video processing chip 210 comprises a plurality of video decoders 211 to receive and process the input video data to generate the digital video signals to the plurality of DACs 212, respectively. The plurality of DACs 212 convert the digital video signals into the analog video signals individually. The video processing chip 210 further comprises a plurality of feedback pins 213. In the embodiment, configurations of the video output interface circuit 220 and the display device 240 in FIG. 2 are similar to those shown in FIG. 1.

In the embodiment, each of the detection circuits 230 detects the voltage of the horizontal sync signals of the analog video signals output by the corresponding video output interface 220, and generates the feedback signal at high logic level or low logic level to the corresponding feedback pin 213 accordingly. Correspondingly, the plurality of video decoders 211 and the plurality of DACs 212 are under the control of the feedback signals received by the plurality of feedback pins 213, respectively.

It is apparent that embodiments of the present disclosure provide a video device operable to output video signals according to connection of video output interface circuit to display devices. The video device stops outputting the video signals to the video output interface circuit so as to save power when the display device is not connected to the video output interface circuit.

It is believed that the present embodiments and their advantages will be understood from the foregoing description, and it will be apparent that various modifications, alternations and changes may be made thereto without departing from the spirit and scope of the present disclosure, the examples hereinbefore described merely being preferred or exemplary embodiments of the present disclosure.

What is claimed is:

1. A video device to generate analog video signals to a plurality of display devices, the video device comprising:
   a video processing chip converting input video data into the analog video signals;
   a plurality of video output interface circuits receiving the analog video signals, and transmitting the analog video signals to a corresponding plurality of display devices, wherein the video output interface circuit comprises a filter circuit filtering noise in the analog video signals, an amplifier circuit amplifying the filtered analog video signals, a match circuit configured for impedance matching between the video output interface circuit and the display device, and a blocking circuit blocking direct current (DC) interference; the blocking circuit comprising a first end connected to the match circuit and a second end configured as an output of the video output interface circuit; and a plurality of detection circuits individually detect voltage of horizontal sync signals within the analog video signals output from the plurality of video output interface circuits, and correspondingly generating a plurality of feedback signals to the video processing chip to indicate connection of the plurality of video output interface circuits to the corresponding plurality of display devices.

2. The video device as claimed in claim 1, wherein the video processing chip comprises:
  at least one video decoder converting the input video data into digital video signals;
  a plurality of digital to analog convertors converting the digital video signals into the analog video signals, and transmitting the analog video signals to the plurality of video output interface circuits.

3. The video device as claimed in claim 2, wherein the video processing chip further comprises a plurality of feedback pins receiving the plurality of feedback signals.

4. The video device as claimed in claim 3, wherein the at least one video decoder and the plurality of digital to analog convertors are under the control of the plurality of feedback signals.

5. The video device as claimed in claim 3, wherein the feedback pin is formed of alternative one of an interrupt pin and a general purpose input/output pin configured in the video processing chip.

6. The video device as claimed in claim 1, wherein the amplifier circuit has an amplification coefficient of two.

7. The video device as claimed in claim 1, wherein the blocking circuit is a DC blocking capacitor.

8. The video device as claimed in claim 1, wherein the detection circuit comprises:
  a switch circuit comprising an input detect the voltage of the horizontal sync signals of the analog video signals, and an output generating the feedback signal to the video processing chip; and
  a charger circuit connected between the output of the switch circuit and the ground.

9. The video device as claimed in claim 8, wherein the switch circuit comprises:
  a transistor comprising a base grounded, a collector connected to a reference voltage via a first resistor, and a emitter acting as the input of the switch circuit detecting the voltage of the horizon signals of the analog video signals;
  a metal-oxide semiconductor (MOS) transistor comprising a source grounded, a gate connected to the emitter of the transistor via a second resistor, and a drain connected to the reference voltage and acting as the output of the switch circuit outputting the feedback signal.

10. The video device as claimed in claim 8, wherein the charger circuit is a capacitor connected between the output of the switch circuit and ground.

11. A video device to generate analog video signals to a plurality of display devices, the video device comprising:
  a video processing chip converting input video data into the analog video signals;
  a plurality of video output interface circuits receiving the analog video signals, and transmitting the analog video signals to a corresponding plurality of display devices; and
  a plurality of detection circuits individually detecting voltage of horizontal sync signals within the analog video signals output from the plurality of video output interface circuits, and correspondingly generating a plurality of feedback signals to the video processing chip to indicate connection of the plurality of video output interface circuits to the corresponding plurality of display devices, wherein the detection circuit comprises a switch circuit comprising an input detecting the voltage of the horizontal sync signals of the analog video signals and an output generating the feedback signal to the video processing chip, and a charger circuit connected between the output of the switch circuit and the ground.

12. The video device as claimed in claim 11, wherein the switch circuit comprises:
  a transistor comprising a base grounded, a collector connected to a reference voltage via a first resistor, and a emitter acting as the input of the switch circuit detecting the voltage of the horizon signals of the analog video signals;
  a metal-oxide semiconductor (MOS) transistor comprising a source grounded, a gate connected to the emitter of the transistor via a second resistor, and a drain connected to the reference voltage and acting as the output of the switch circuit outputting the feedback signal.

13. The video device as claimed in claim 11, wherein the charger circuit is a capacitor connected between the output of the switch circuit and ground.

* * * * *